(12) United States Patent
Nishida

(10) Patent No.: US 8,070,148 B2
(45) Date of Patent: Dec. 6, 2011

(54) CUTTING BOARD EXCELLENT IN A DRAINAGE FUNCTION

(76) Inventor: Kunihiko Nishida, Kamagaya (JP)

( * ) Notice: Subject to any disclaimer, the term of this patent is extended or adjusted under 35 U.S.C. 154(b) by 1186 days.

(21) Appl. No.: 11/810,538

(22) Filed: Jun. 6, 2007

(65) Prior Publication Data

US 2007/0281545 A1 Dec. 6, 2007

(30) Foreign Application Priority Data

Jun. 6, 2006 (JP) ................................. 2006-157254

(51) Int. Cl.
  *A47J 47/00* (2006.01)
  *A47J 47/20* (2006.01)
  *B23Q 3/00* (2006.01)
(52) U.S. Cl. ................................. 269/302.1; 269/289 R
(58) Field of Classification Search ................ 269/302.1, 269/289 R; 225/46; 297/251; *A47J 47/00, A47J 47/16*
  See application file for complete search history.

(56) References Cited

U.S. PATENT DOCUMENTS

| 602,125 | A | * | 4/1898 | Burrows | ........................... 4/579 |
| 3,333,555 | A | * | 8/1967 | Kapnek | ........................... 108/152 |
| 7,077,392 | B2 | * | 7/2006 | Siegel et al. | ................ 269/302.1 |

FOREIGN PATENT DOCUMENTS

| JP | 51-092355 | | 1/1950 |
| JP | 53-032661 | | 8/1951 |
| JP | 59-077956 | | 5/1984 |
| JP | 60-137949 | | 9/1985 |
| JP | 2-283338 | | 11/1990 |
| JP | 3-162809 | | 7/1991 |
| JP | 11299664 | A | * 11/1999 |
| JP | 2002-039138 | | 2/2002 |
| JP | 2002-112846 | | 4/2002 |
| JP | 2006345939 | A | * 12/2006 |

* cited by examiner

*Primary Examiner* — Lee D Wilson
*Assistant Examiner* — Jamal Daniel
(74) *Attorney, Agent, or Firm* — Jordan and Hamburg LLP

(57) ABSTRACT

A cutting board, including retaining holes in a side surface thereof, each retaining hole including a screw hole at an end side of the retaining hole and a first fitting portion at an opening side of the retaining hole; projecting rods inserted into the retaining holes each include a cylindrical second fitting portion and a threaded portion to be screwed onto the screw hole with ends of the second fitting portion projecting from the side surface of the cutting board; a remaining portion of each first fitting portion is fit into the fitting portion of each retaining hole; each projecting rod is pivoted in a forward and reverse direction to allow the threaded portion thereof to move in a left and right direction within the screw hole; the length of each of the projecting portions projecting from the side surface of the cutting board is adjusted to fasten each projecting rod.

4 Claims, 4 Drawing Sheets

CUTTING BOARD EXCELLENT IN A DRAINAGE FUNCTION

BACKGROUND OF THE INVENTION

The present invention relates to a cutting board intended to be used in such a way that it is placed on an upper section of a sink. More specifically, the invention relates to the cutting board excellent in a drainage function that includes projecting rods projecting from a side surface of the cutting board, a length of a projecting portion of each of the projecting rods being adjustable at will, which can be used for every shaped and every sized sink, and which can effectively drain water on the cutting board into an interior of a sink.

There has been a cutting board intended to be used in such a way that it is set slidably in an upper section of a sink, for example, of a built-in kitchen. Since such a cutting board is so structured that opposed side surfaces of the cutting board are directly set in upper steps of the sink, there are no sufficient space through which water on the cutting board is drained into an interior of the sink. As such, there may be a case where water on the cutting board flows along a peripheral wall of the sink, and then overflows from the sink to flood over the floor. Therefore, in a case where a person cooks or washes a surface of the cutting board with water running, there arises a problem in which water may spills out over the floor.

For resolving the above described problem, for example, patent document 1 discloses a cutting board with L-letter shaped leg sections, each leg section jettying out from each side of the cutting board to provide a space between the cutting board and fitting steps of a sink in order to allow water on the cutting board to drain out through the space. With such a cutting board, the problem regarding the drainage could be resolved. However, there is such a drawback that this cutting board is available only to such a sink having a width suitable for a distance between the leg sections. It will also be difficult to place the cutting board on the sink having supporting steps of a curved shape on a sink top for the cutting board (see FIG. 7), since the leg sections are not made separately and thus their lengths are not independently adjustable.

Patent document 2 discloses a cutting board including hole-shaped or groove-shaped drainage sections on both ends of the cutting board through which water on a cutting board is flown down into an interior of a sink after it is guided in an declining direction or a width direction of the cutting board main body. Such a cutting board, however, has a limit in sizing holes and grooves, since the strength of the supporting sections decrease as the width of the holes and the grooves becomes large if the cutting board is made of wood or plastic. There also has been such a problem that a workable area of the cutting board becomes narrower if the holes and the grooves are positioned near to a center of the cutting board in order to avoid such a problem that the holes and the grooves may be hidden in the width of steps of the sink if the steps of the sink on which the cutting board is placed is wide.

[Patent document 1] Japanese Patent Laying-open Publication No. 02-283338

[Patent document 2] The Japanese Patent Laying-open Publication No. 03-162809

SUMMARY OF THE INVENTION

With regard to a cutting board intended to be used by placing it on an upper section of a conventional sink, the inventor of the present application has made a keen examination on a method that is most effective for draining water on a cutting board. As a result thereof, the inventor conceived an idea of the invention based on the knowledge that the above described problem can be resolved if the projecting rods of which lengths are adjustable at will are provided in a side surface of the cutting board. Therefore, an object of the invention is to resolve the above described problem and thus to provide such a cutting board having an excellent drainage function in which the cutting board is designed to be applicable to various sizes of sinks and various shapes of placing surfaces where the cutting board is placed, which can obviate occurrences of bacteria and fungus due to moisture from occurring to keep the cutting board hygienic, and which is convenient in use.

To resolve the above described problem, in a cutting board intended to be used by placing it on an upper section of a sink in a kitchen, the invention is characterized in that: retaining holes are provided in a side surface of the cutting board, each retaining hole including a screw hole at an end side of the retaining hole and a first fitting portion at an opening side of the retaining hole; projecting rods are inserted into the retaining holes, each projecting rod including a cylindrical second fitting portion and a threaded portion to be screwed onto the screw hole, to leave ends of the second fitting portion projecting from the side surface of the cutting board; a remaining potion of each second fitting portion is fit into each second fitting portion; each projecting rod is pivoted in an forward and reverse direction to allow the threaded portion thereof to move in a left and right direction within the screw hole; the length of each of the projecting portions projecting from the side surface of the cutting board is adjusted, as required, to finally fasten each projecting rod; and the cutting board is placed on the upper section of the sink with a support of the projecting portions of the projecting rods and the other end of the cutting board.

To resolve the above described problem, a preferable cutting board of the invention is characterized in that: a cross section of at least one of the side surfaces of the cutting board is formed into a tapered shape including a streamline shape, a semi-oval shape or a triangle shape.

To resolve the above-described problem, a preferable cutting board of the invention is characterized in that: an end of the projecting portion of each projecting rod is covered with a synthetic resin-made cap or a rubber-made cap in a removable manner.

To resolve the above described problem, a preferable cutting board of the invention is characterized in that: the projecting rods are provided in both of the opposed side surfaces of the cutting board in a projected state, thereby placing the cutting board on the upper section of the sink with a support of the projecting portions projecting from both side surfaces of the cutting board.

To resolve the above described problem, a preferable cutting board of the invention is characterized in that: the screw hole is formed throughout the length of an interior of each retaining hole that is made in the side surface of the cutting board, wherein the threaded portion is provided throughout the length of each projecting rod except for one end thereof; and the threaded portion is screwed onto each screw hole to fasten the projecting rod in the side surface of the cutting board.

The cutting board of the invention having the above described structure can be tightly fit on the steps of the sink top and therefore completely prevent the cutting board itself from having a backlash since the lengths of the projecting portions are fixed but are appropriately adjustable. The projecting rods can be made of any materials and made into any sizes. Since the cutting board is securely placed on the sink even if the cutting board is deflected due to strong power applied thereto, it will be convenient when a person cleans up a big fish or the like. The cutting board of the invention may also be used as a conventional slide type cutting board if used by placing it on the steps of the sink top. The fitting portion A and the fitting portion B are structured in an almost water-tight manner, so that water invasion into the retaining holes in the side surface of the cutting board can be blocked, and occurrences of bacteria and fungus can be obviated, resulting in that the cutting board can be kept hygienic. The cutting board comes to have an excellent drainage function by making a wide space between a side surface of the cutting board and an interior wall of the sink. In addition, the projecting rods have the sufficiently bearable strength even if a large space is provided between the side surface of the cutting board and the interior wall of the sink. Also, the cutting board having two projecting rods in its side surface will be hygienic since the projecting portions serve as legs when the cutting board is propped up in an interior of the sink or against a wall of the sink after use thereof.

The cutting board according to a second aspect of the invention has a cross section of its side surface that is formed into a tapered shape such as a streamline shape or a semi-oval shape, such that water on the cutting board will be guided to an side surface of the cutting board as well as flow down into the sink. The cutting board according to a third aspect of the invention includes synthetic resin-made or rubber-made caps that removably cover the ends of the projecting portions, which provides a good appearance. In addition, the cutting board will be tightly fixed on the steps of the sink top, if the rubber-made caps having a higher frictional coefficient are used, whereas it will be convenient since the cutting board can move smoothly when it is used as a slidable cutting board if the olefin series resin-made caps having a lower frictional coefficient are used.

The cutting board of the invention according to a fourth aspect of the invention includes the projecting rods provided in both of the opposed side surfaces of the cutting board in a projected manner from the surfaces, such that water on the cutting board is guided from both side surfaces of the cutting board to the interior of the sink, resulting in increasing a drainage effect. Such a structure that the lengths of the projecting portions in one side surface and the lengths of the projecting portions in the other side surface of the cutting board are varied will enable the use with the cutting board turning around in considering the convenience. If the upper steps on which the cutting board is supported have a curved shape, the lengths of the projecting portions can be adjusted in accordance with the shape of the upper steps (see FIG. 7). The cutting board according to a fifth aspect of the invention is the one in which bolts are secured to the side surface of the cutting board using nuts in stead of using fitting portions, and thus it has a merit that the lengths of the projecting portions can be adjusted with ease.

DETAILED DESCRIPTION OF THE INVENTION

Figure 1:
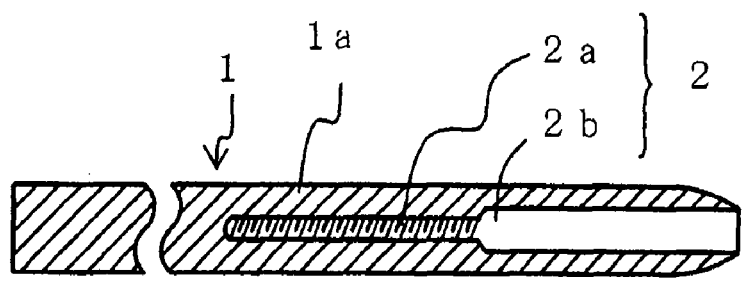
FIG. 1 is an end-view illustrating a portion of a retaining hole of a cutting board according to an embodiment of the invention.
Figure 2:
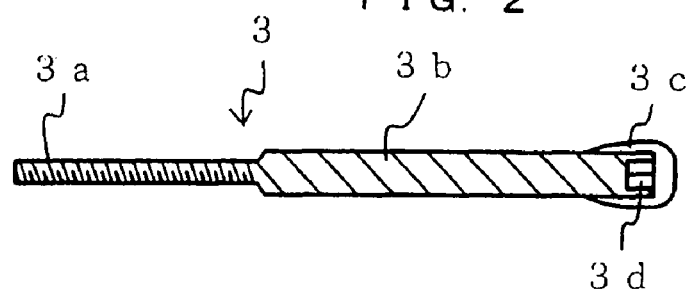
FIG. 2 is a longitudinal sectional view of a projecting rod for the cutting board according to the embodiment of the invention.
Figure 3:
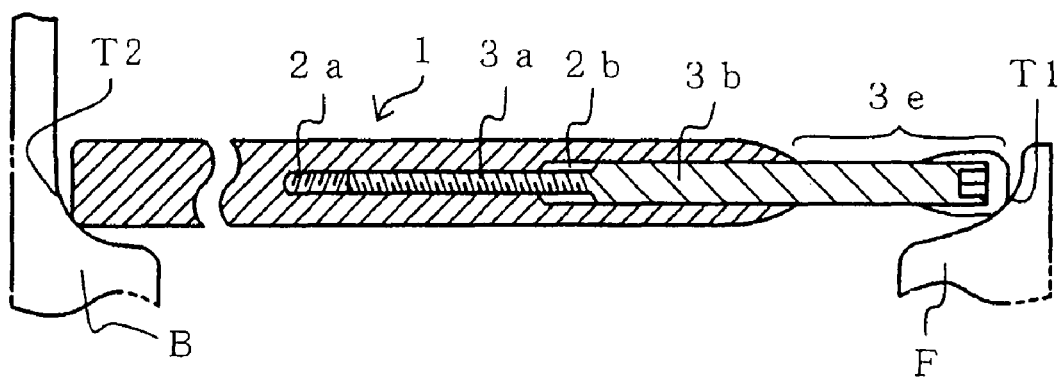
FIG. 3 is a sectional view of FIG. 6 taken along a III-III line in which a condition that the cutting board is placed by steps of a sink top is illustrated.
Figure 6:
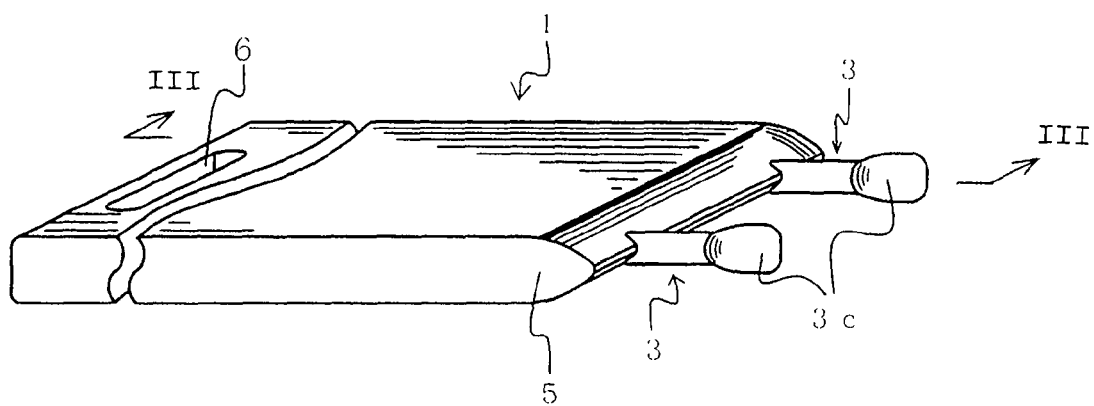
FIG. 6 is a perspective view illustrating a cutting board according to another embodiment of the invention.
Figure 7:
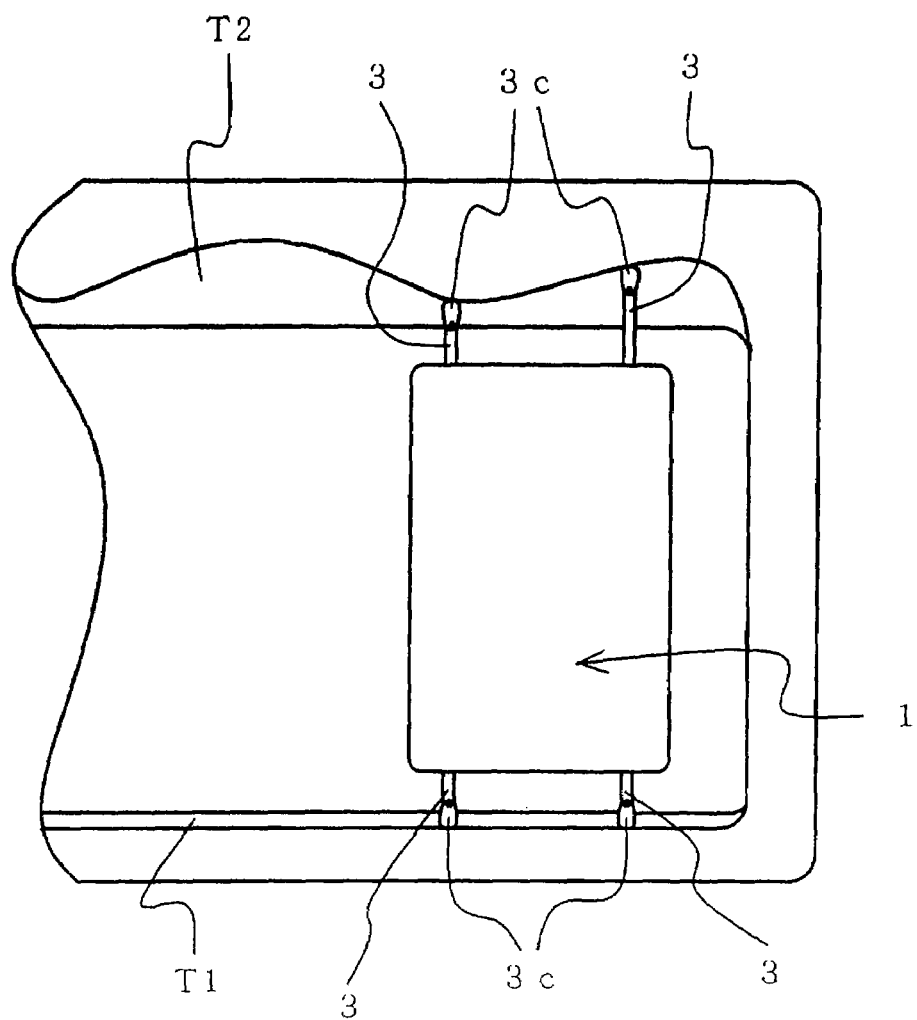
FIG. 7 is a plane view illustrating a condition that the cutting board according to the embodiment of the invention is supported by the steps of the sink top having a curved shape.

The best mode of an embodiment for carrying out the invention will be described below in detail with reference to the accompanying drawings. It should be appreciated that the invention is not limited to the embodiment described herein as well as any other embodiments. The cutting board of the invention according to the embodiment encompasses all the aforementioned first to fourth aspects of the invention and the cutting boards of the invention according to the other embodiments encompass the aforementioned second to fifth aspects of the invention. FIG. 1 is an end view illustrating a portion of a retaining hole of the cutting board according to the embodiment of the invention; FIG. 2 is a longitudinal sectional view of a projecting rod with a cap covering one end of the rod; and FIG. 3 is a cross-sectional view illustrating a state that the cutting board, having the projecting rod inserted into the retaining hole of the cutting board in order to secure it in the retaining hole, is supported by the steps of a sink top. FIG. 6 is a perspective view of the cutting board according to the embodiment. FIG. 7 is a plane view illustrating a state that the cutting board according to the embodiment having projecting rods on its both side surfaces is supported by the steps of the sink top having a curved shape.

In FIGS. 1 to 3 and 6, 1 denotes a cutting board; 1a denotes a cutting board main body; 2 denotes a retaining hole; 3 denotes a projecting rod; and 6 denotes a gripping hole. The cutting board 1 according to the embodiment is the one intended to be used in a manner being placed on an upper section of a sink in a kitchen. Such a cutting board may be made of any materials. Such a cutting board may be widely applied, for example, to a plastic-made cutting board and a wooden cutting board that are general cutting boards. The cutting board is provided with two retaining holes 2, 2 in a side surface of the cutting board, namely, in a side surface facing to a near side F of the sink, side by side, with an appropriate span between those retaining holes. Alternatively, the cutting board is provided with two retaining holes 2, 2 on both of the side surfaces respectively side by side, with one side surface facing to the near side F of the sink and the other side surface facing to a back side B of the sink. Each of the retaining holes 2 includes a fitting portion 2b having a cylindrical hole at its opening side and a screw hole 2a in a deep side of the fitting portion, the screw hole having a diameter slightly smaller than that of the fitting portion 2b and being threaded continuously toward an end of the screw hole. It is as a matter of course that the cutting board of the invention is applicable to such a general cutting board in which side surfaces thereof are generally formed at a right angle with respect to a front surface and a back surface. However, it is preferable that a side surface in which the retaining holes 2 are provided is formed, for example, into a tapered shape such as a streamline shape, a semi-oval shape or a triangle shape as illustrated by a tapered section 5 in FIGS. 5 and 6.

For forming the retaining holes 2 in a commercially available cutting board or a ready-made cutting board, a drilling tool such as a drilling machine and subsequently a screw-tap for threading are used. Thermoplastic resin-made cutting boards are generally manufactured by an injection molding method. It is preferable for those thermoplastic resin-made cutting boards to have the retaining holes 2 formed therein in the process of a manufacture of those cutting boards. The screw hole 2a can be formed in such a manner that the thermoplastic resin material is threaded directly by means of a split mold (a metal mold). It is, however, preferable to form the screw hole in such a manner that a corrosive-resistant metal-made screw hole such as a stainless steel-made screw hole is preliminarily placed in the metal mold and this metal-made screw hole is inserted into the resin material. The metal made screw hole is remarkably excellent in the strength and the durability against the friction, and thus no looseness will occur even it is subjected to the use for a long time.

The projecting rod 3, as shown in FIG. 2, includes a threaded portion 3a at one end of the cylindrical fitting portion 3b, the threaded portion 3a having a diameter slightly smaller than that of a cylindrical fitting portion 3b and being screwed on the screw hole 2a of the retaining hole 2. Any materials can be used for the projecting rod 3. For example, the threaded portion 3a may preferably be made of corrosive resistant metal such as stainless steel, and the fitting portion 3b may preferably be made of a flexible material such as a thermoplastic resin. The projecting rod may have either one of a structure that one end of the threaded portion 3a is embedded into one end of the fitting portion 3b or a structure that a metal-made bolt is embedded throughout the fitting portion 3b in its longitudinal direction in consideration of the strength of the projecting rod. In the case where the metal made bolt is embedded into the end of the projecting portion of the fitting portion 3b or throughout the fitting portion 3b in its longitudinal direction, a hexagon hole 3d is formed at a tip end of the bolt in a fitting portion side. This hexagon hole 3d can adjust the length of the projecting portion, for example, by inserting a hex wrench (a hexagonal wrench) into the hexagon hole 3d to pivot the projecting rod 3 in a forward and reverse direction. The end of the projecting portion is covered with a cap 3c.

The projecting rod 3 is tightened up in such a state that the fitting portion B3b fits in the fitting portion 2b to be secured therein with a help of a friction force between fitting surfaces. Preferably, the projecting rod is tightened up by a firmness to the extent that the projecting rod 3 would not pivot due to the idling of the fitting portion 3b when a person slides a cutting board while the projecting rod is tightened up, a firmness to the extent that a human power by a male or a female adult can press fit the fitting portion 3b into the fitting portion 2b, and a firmness to the extent that a human power by a male or a female adult can pivot the projecting rod 3 in order to adjust the length of the projecting portion 3e. The projecting rod may be pivoted with a bear hand or by using a tool such as a wrench. A boundary face between the fitting portions 2b, 3b preferably has a water-tightness, though it is not necessarily a perfect water-tightness. It is more preferable that the fitting portions 2b and 3b fit to each other with an air-permeability.

That is, it is preferable, when the fitting portion 3b is moved in its longitudinal direction while it is pivoted, air within the retaining hole 2 is communicated with the outside air through a space between the surfaces of the fitting portions 2b, 3b. Perfect blocking of air within the retaining hole will make a movement of the fitting portion 3b difficult. In order to keep this air permeability, it is preferable, for example, that the surfaces of the fitting portions 2b, 3b are formed into rough faces, the fitting portions 2b, 3b are made of a continuous foam that is made by foaming thermoplastic resin, or the fitting portions 2b, 3b are made of thermoplastic resin in which a filler such as calcium carbonate is highly filled. It is further preferable that the fitting portion 3b, the fitting portion 2b, the cutting board main body and an interior surface of the retaining hole 2 are applied with a mixture of fungicide or deodorant such as silver powders or copper powders.

Figure 4:
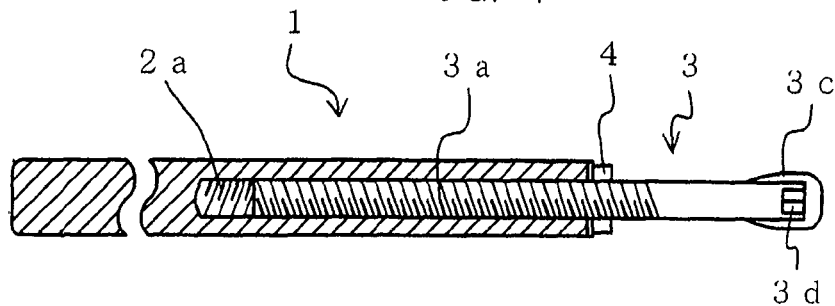
FIG. 4 is a longitudinal sectional view of FIG. 5 taken along a IV-IV line.
Figure 5:
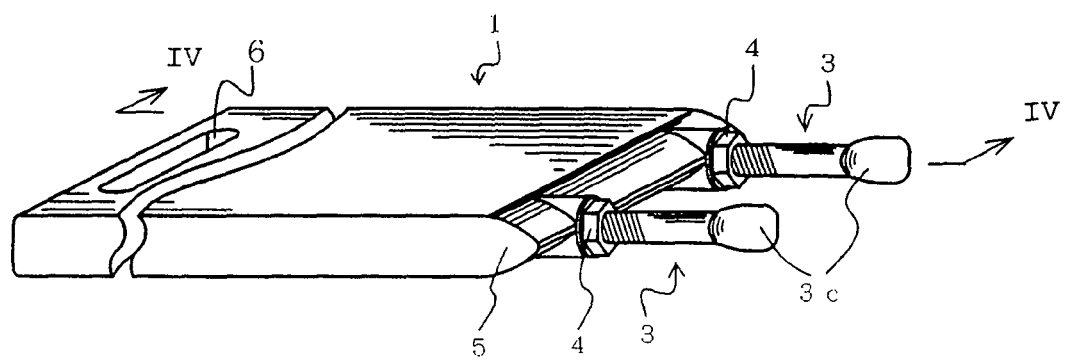
FIG. 5 is a perspective view illustrating a cutting board according to another embodiment of the invention.

Another embodiment will be described below. FIG. 4 is a cross-sectional view illustrating portions of a bolt and a screw hole of the cutting board according to another embodiment of the invention; and FIG. 5 is a perspective view of the cutting board according to another embodiment of the invention, respectively. The cutting board according to another embodiment equals to the above described embodiment except for the points that a screw hole 2a is provided throughout the length of the retaining hole 2, that the threaded portion 3a is provided throughout the length of the projecting rod 3 except for one end of the projecting rod, and that the threaded portion 3a is screwed onto the screw hole 2a and then is fastened on a side surface of the cutting board using a nut 4. FIGS. 4 and 5 illustrate such a cutting board that the projecting rods 3 are provided in one side surface of the cutting board main body. Those projecting rods 3, however, may be provided in both of the opposed side surfaces of the cutting board. Generally, lock nut is preferable for the nut 4 in order to stop loosening thereof. The lock nut to be used herein may, for example, be the one in which a lock nut thinner than the nut is interposed under the nut, or the other commercially available lock nuts. Preferably, a washer is interposed between the nut and the projecting rod in order to improve seating condition of the nut, and a rubber packing is used in order to avoid water invasion into the screw hole 2a. The nut is provided, as required. If the threaded portion 3a can be tightly fastened within the screw hole 2a, the nut is not always required.

Figure 8:
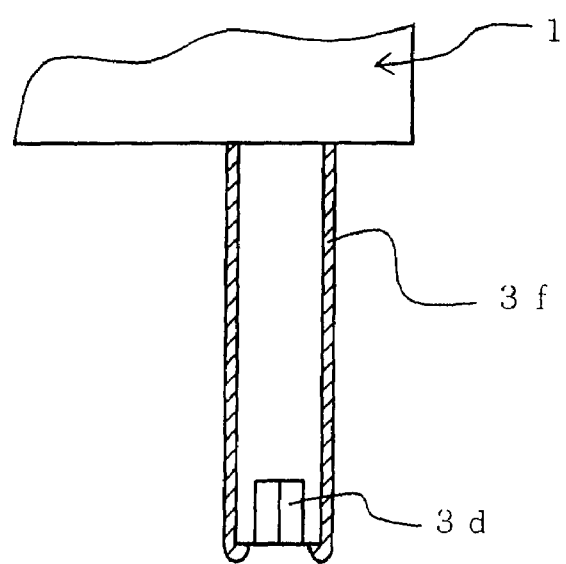
FIG. 8 is a partially enlarged longitudinal sectional view of cylindrical cap.
Figure 9:
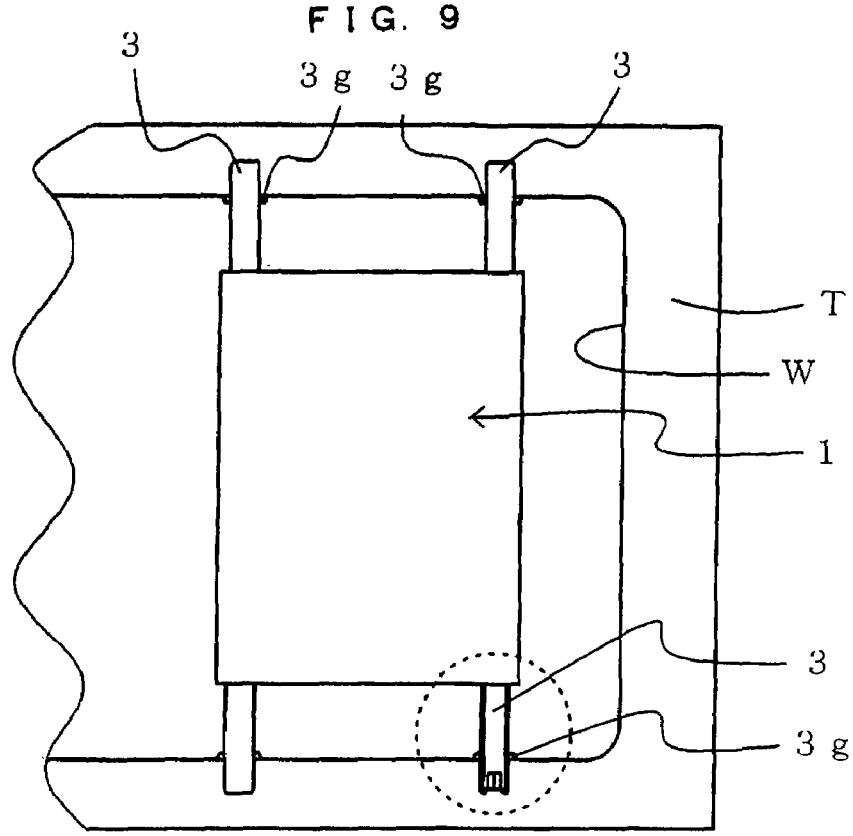
FIG. 9 is a plan view illustrating a condition that the cutting board with projecting rods, each having a ring-shaped collar on its cylindrical cap, is placed on a so-called island type sink.
Figure 10:
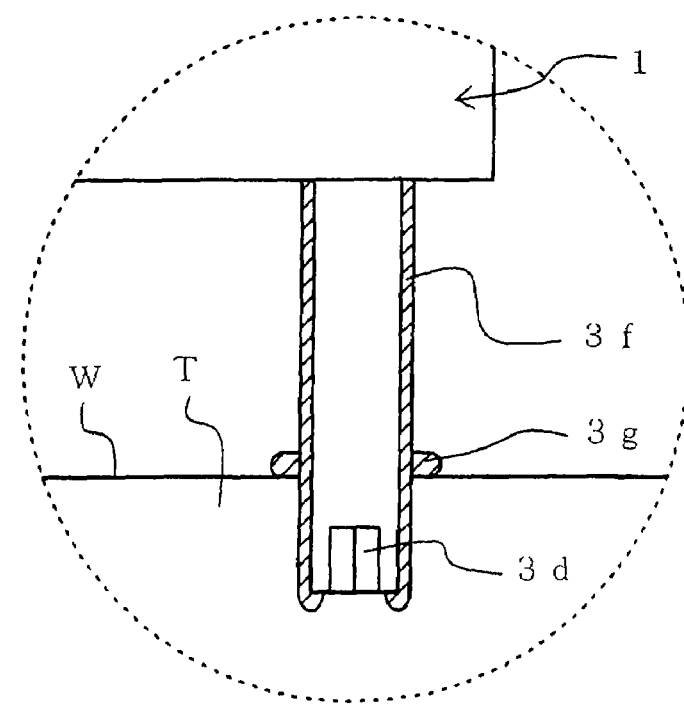
FIG. 10 is a partially enlarged longitudinal sectional view of FIG. 8.

The above-described cutting boards according to the embodiment and the other embodiments only exemplify a typical cutting board of the present invention. The aforementioned cutting boards can further be modified, for example, so as to use a rubber packing in addition to the lock nut as used in the cutting board described in the above embodiment, and a ring member such as a synthetic resin-made ring member or a rubber made-ring member are mounted as securing means for tightly fastening the projecting rod 3 to the side surface of the cutting board in stead of the fitting portion 3b or the fitting portion 2b. Unless such improvements otherwise depart from the spirit and scope of the present invention, they should be construed as being included in the present invention. Instead of the above-described caps, cylindrical caps that are obtained by cutting a synthetic resin-made hose may be press fit from the ends of the projecting portions to the side surface of the cutting board (see FIG. 8). In order to make the cutting board of the invention suitable for a so-called island-type sink in which there is no such a portion that corresponds to the steps of the sink top and thus the sink top T and the interior wall W of the sink cross at a right angle, a ring shaped collar 3g may be formed on an external wall of each cylindrical cap 3f in order to allow a front portion of the collar to abut against a surface of the interior wall w of the sink for a securing purpose (see FIG. 9 and FIG. 10).

An embodiment of the invention will be described below. It should be appreciated that the invention, however, will not be limited to this embodiment. In the above described embodiment, the present embodiment uses the cutting board 1a made of polyethylene having medium density or high density in which the fitting portions 2b are formed in one side surface of the cutting board by making two holes with an appropriate span between those holes and the screw holes 2a are also formed at ends of the above holes respectively by screwing holes to finally form two sets of retaining holes 2. Then, two stainless steel-made bolts to be screwed onto the screw holes 2a and two polypropylene-made cylindrical columns having a diameter equal to an inner diameter of the fitting portion 2b or slightly larger than the inner diameter of the fitting portion 2b are prepared, one ends of the cylindrical columns are provided with holes into which ends of the bolts are embedded to be fixed respectively, as well as other ends of the cylindrical columns are provided with hexagon hole 3d respectively, resulting in forming projecting rods 3. Soft synthetic rubber-made or soft polyethylene-made caps 3c are also made in order to be mounted on the projecting rods 3.

Subsequently, the cutting board 1 according to the embodiment is obtained in the following manner. That is, each of the projecting rods 3 is inserted into the retaining hole 2 of the cutting board main body 1a from an end of the threaded portion 3a; each of the fitting portions 3b is gripped with a hand or provided with a hex wrench (a hexagon wrench) to be inserted into a hexagon hole 3d provided at an end of the fitting portion 3b when the end of the threaded portion 3a reaches the screw hole 2a of the retaining hole 2; the projecting rod 3 is further press-fit into an interior of the retaining hole 2 by twisting the projecting rod 3; and the cap 3c is mounted on the end of the projecting rod 3. Then, each of the projecting rods 3 is pivoted in the forward and reverse direction to adjust the length of the projecting portion, as required, so as to allow the cutting board 1 to be supported by positions of a step T1 at the near side F of the sink top and the step T2 at the back side B of the sink top. As such, the cutting board is placed on the upper section of the sink. As shown in FIG. 3, preferably, each end of the projecting rods 3 and the other end of the cutting board are suspended above horizontal surfaces of the corresponding steps T1, T2 of the sink top respectively to allow them to abut against the near side F and the back of side B, respectively, of the sink, thereby ensuring a stable seating and no looseness of the cutting board. In addition to the cutting board 1 according to the above-described embodiment, another cutting board 1 according to the other embodiment was obtained following the description and with the similar materials in the above described another embodiment.

A plurality of monitors such as housewives and cooks qualified as a chef are invited to test-use the cutting board 1 according to the above-described embodiment and the other embodiments. The result was researched from the monitors and such a good evaluation was obtained from all of the monitors that every cutting board was convenient in use in comparison with the conventional cutting boards. Specifically, there was an opinion from a cook qualified as a chef that the cutting board was convenient upon cleaning a large fish since the cutting board was tightly supported even when the cutting board was subjected to the cook's weight, and the work could be done quickly with the cutting board as well as the cutting board was cleaned up with ease since water dropped down into an interior of the sink but did not flow out to the outside of the sink even when the cook worked with the cutting board while it is watered.

INDUSTRIAL APPLICABILITY

The cutting board according to the invention can be applied at will to a sink with any size and a surface of any shape on which the cutting board is supported. The cutting board according to the invention is extremely useful in that: it also has a hygienic and conventional high drainage function that obviates bacteria and fungus due to moisture from occurring, and it is safety in use and can produce an excellent economical effect.

The invention claimed is:

1. A cutting board for placement on an upper section of a sink, comprising:
   a cutting board body including retaining holes being provided in at least one lateral edge surface of the cutting board itself, each of said retaining holes including a screw hole at an end side of the retaining hole and a first fitting portion at an opening side of the retaining hole;
   projecting straight rods being inserted into the retaining holes, each of said straight projecting rods including a cylindrical second fitting portion and a threaded portion to be screwed into the screw hole, to leave ends of the second fitting portions projecting, as projecting portions, from the side surface of the cutting board body;
   a remaining portion of each of said second fitting portions being fit into a corresponding one of said first fitting portions, a boundary face between each of the first portions and the second fitting portions being substantially water-tight;
   each of the projecting straight rods being pivoted in a forward and reverse direction to allow the threaded portion thereof to move in a left and right direction within the screw hole;
   a length of each of the projecting portions projecting from the side surface of the cutting board being adjustable, as required, to finally fasten each of the projecting straight rods,
   such that the cutting board is receivably supportable on the upper section of the sink by the projecting portions of the projecting straight rods and an opposite end of the cutting board; and
   a cross section of the at least one lateral edge surface of the cutting board body is formed into a tapered shape including a streamline shape, a semi-oval shape or a triangle shape.

2. The cutting board according to claim 1, wherein an end of each of the projecting portions of the projecting rods is covered with a synthetic resin-made cap or a rubber-made cap in a removable manner.

3. The cutting board according to claim 1, wherein:
   said at least one lateral edge surface includes opposed lateral edge surfaces; and
   the projecting rods are provided on both of the opposed lateral edge surfaces of the cutting board body in a projected state, thereby permitting placement of the cutting board on the upper section of the sink with a support of the projecting portions projecting from both opposed lateral edge surfaces of the cutting board body.

4. The cutting board according to claim 1, further comprising cylindrical caps that are obtained by cutting a synthetic resin-made hose, said cylindrical caps being press-fit from terminal ends of the projecting portions to the at least one lateral edge surface of the cutting board body.

* * * * *